United States Patent
Gutman et al.

[11] 3,771,995
[45] Nov. 13, 1973

[54] METHOD OF COMBATING WEEDS WITH CERTAIN OXIME ESTERS

[75] Inventors: Arnold D. Gutman, San Rafael; Don R. Baker, Pinole, both of Calif.

[73] Assignee: Stauffer Chemical Company, New York, N.Y.

[22] Filed: July 2, 1970

[21] Appl. No.: 60,960

Related U.S. Application Data

[62] Division of Ser. No. 746,309, July 22, 1968, Pat. No. 3,592,920.

[52] U.S. Cl. .................................................. 71/121
[51] Int. Cl. .............................................. A01n 9/20
[58] Field of Search ................. 71/121; 260/566 AE

[56] References Cited
UNITED STATES PATENTS

| | | | |
|---|---|---|---|
| 3,165,392 | 1/1965 | Koopman | 71/121 |
| 3,483,231 | 12/1969 | Marcus et al. | 71/121 |
| 3,547,621 | 12/1970 | Neighbors et al. | 71/121 |

*Primary Examiner*—Lewis Gotts
*Assistant Examiner*—Catherine L. Mills
*Attorney*—Wayne C. Jaeschke et al.

[57] ABSTRACT

Compounds having the formula

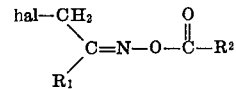

in which hal is chlorine, bromine or iodine, $R^1$ is (1) hydrogen, (2) lower alkyl, (3) aryl, (4) nuclear substituted derivatives thereof in which the substituents are halogen, nitro, lower alkoxy, lower alkyl, or cyano and (5) haloalkyl, and $R^2$ is (1) aryl, (2) nuclear substituted derivatives thereof in which the substituents are halogen, cyano, nitro, lower alkoxy, or lower alkyl, (3) styryl, (4) nuclear substituted styryl, in which the substituents are halogen, cyano, nitro, lower alkoxy or lower alkyl, (5) benzyl, (6) nuclear substituted benzyl in which said substituents are halogen, cyano, nitro, lower alkoxy or lower alkyl, (7) phenethyl, (8) nuclear substituted phenethyl in which the substituents are halogen, cyano, nitro, lower alkoxy, or lower alkyl, (9) cyclo-alkyl having 3 to 6 carbon atoms, and (10) furyl.

4 Claims, No Drawings

METHOD OF COMBATING WEEDS WITH CERTAIN OXIME ESTERS

This application is a division of copending application Ser. No. 746,309, filed July 22, 1968 now U.S. Pat. No. 3,592,920.

This invention relates to novel chemical compounds and to their use as herbicides and acaricides and in controlling fungi and bacteria. More particularly, the chemical compounds are certain keto oxime esters.

The compounds of the present invention are those having the formula

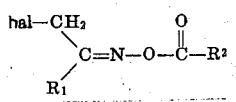

in which hal is a member selected from the group consisting of chlorine, bromine and iodine, preferably chlorine, $R^1$ is a member selected from the group consisting of (1) hydrogen, (2) lower alkyl, preferably having from one to six carbon atoms, (3) aryl, preferably phenyl, (4) nuclear substituted derivatives thereof in which the substituents are selected from the group consisting of halogen, nitro, lower alkoxy, preferably having from one to four carbon atoms, more preferably methoxy, lower alkyl, preferably having one to four carbon atoms, more preferably, methyl, and cyano and (5) haloalkyl, preferably having from one to four carbon atoms; most preferably chloromethyl, and $R^2$ is a member selected from the group consisting of (1) aryl, preferably phenyl (2) nuclear substituted derivatives thereof in which the substituents are selected from the group consisting of halogen, preferably chlorine and bromine, cyano, nitro, lower alkoxy, preferably having from one to four carbons, more preferably methyl, (3) styryl, (4) nuclear substituted styryl, in which the substituents are selected from the group consisting of halogen, preferably chlorine and bromine, cyano, nitro, lower alkoxy, preferably having one to four carbon atoms, more preferably methoxy, and lower alkyl, preferably having one to four carbon atoms, more preferably methyl, (5) benzyl, (6) nuclear substituted benzyl in which said substituents are selected from the group consisting of halogen, preferably chlorine and bromine, cyano, nitro, lower alkoxy, preferably having one to four carbon atoms, more preferably methoxy and lower alkyl, preferably having one to four carbon atoms, more preferably methyl, (7) phenethyl, (8) nuclear substituted phenethyl in which the substituents are selected from the group consisting of halogen, preferably chlorine and bromine, cyano, nitro, lower alkoxy, preferably having one to four carbon atoms, more preferably methoxy and lower alkyl, preferably having one to four carbon atoms, more preferably methyl, (9) cycloalkyl having three to six carbon atoms, preferably cyclohexyl, and (10) furyl.

The term "nuclear substituted" includes both mono and poly substitution with the specified substituent.

The term "halogen" or the prefix "halo" used in describing the compound of the present invention encompass chlorine, bromine, iodine, and fluorine.

Representative compounds of this invention are:
1-chloro-3-bromo-2-propanone-O-(benzoyl) oxime
1-fluoro-2-propanone-O-(benzoyl) oxime
chloroethanal-O-(benzoyl) oxime
α-chloroacetophenone-O-(benzoyl) oxime
α-bromo-4-chloro-acetophenone-O-(benzoyl) oxime
α-chloro-4-nitroacetophenone-O-(benzoyl) oxime
α-chloro-4-cyanoacetophenone-O-(benzoyl) oxime
α-chloro-4-methoxyacetophenone-O-(benzoyl) oxime
α-chloro-4-methylacetophenone-O-(benzoyl) oxime
1,3-dichloro-2-propanone-O-(benzoyl) oxime
1,3-dichloro-2-propanone-O-(napthoyl) oxime
1,3-dichloro-2-propanone-O-(p-chlorobenzoyl) oxime
1,3-dichloro-2-propanone-O-(3,4-dichlorobenzoyl) oxime
1,3-dichloro-2-propanone-O-(3,4,-trimethoxybenzoyl) oxime
1,3-dichloro-2-propanone-O-(p-bromobenzoyl) oxime
1,3-dichloro-2-propanone-O-(p-iodobenzoyl) oxime
1,3-dichloro-2-propanone-O-(p-fluorobenzoyl) oxime
1,3-dichloro-2-propanone-O-(4-butylbenzoyl) oxime
1,3-dichloro-2-propanone-O-(4-cyanobenzoyl) oxime
1,3-dichloro-2-propanone-O-(4-nitrobenzoyl) oxime
1,3-dichloro-2-propanone-O-(4-n-butoxybenzoyl) oxime
1,3-dichloro-2-propanone-O-(cinnamoyl) oxime
1,3-dichloro-2-propanone-O-(p-chlorocinnamoyl) oxime
1,3-dichloro-2-propanone-O-(3,4-dichlorocinnamoyl) oxime
1,3-dichloro-2-propanone-O-(3,4,5-trimethoxycinnamoyl) oxime
1,3-dichloro-2-propanone-O-(p-bromocinnamoyl) oxime
1,3-dichloro-2-propanone-O-(p-iodocinnamoyl) oxime
1,3-dichloro-2-propanone-O-(p-fluorocinnamoyl) oxime
1,3-dichloro-2-propanone-O-(4-t-butyl cinnamoyl) oxime
1,3-dichloro-2-propanone-O-(4-n-butyoxycinnamoyl) oxime
1,3-dichloro-2-propanone-O-(4-cyanocinnamoyl) oxime
1,3-dichloro-2-propanone-O-(4-nitrocinnamoyl) oxime
1,3-dichloro-2-propanone-O-(hydrocinnamoyl) oxime
1-chloro-2-propanone-O-(benzoyl) oxime
1-chloro-2-octanone-O-(benzoyl) oxime
1,6-dichloro-2-hexanone-O-(benzoyl) oxime
1,3-dibromo-2-propanone-O-(benzoyl) oxime
1,3-diiodo-2-propanone-O-(benzoyl) oxime The compounds of the present invention are particularly useful as acaricides. The compounds are also useful in inhibiting the growth of bacteria and fungi. Also, the compounds of the present invention find use as herbicides, especially in post-emergent control of weeds.

The compounds of the present invention can be prepared by reacting a compound of the formula

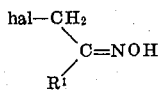

in which hal and R¹ are as defined before with a compound of the formula

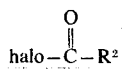

in which halo is chlorine or bromine and R² is a radical as defined as above.

The above reaction yields compounds of the formula

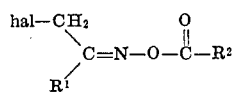

in which hal, R¹ and R² are defined as above.

Preferably, the reaction is carried out in the presence of a base such as pyridine and in a solvent for the reactants. Generally, the reaction is exothermic so no heating is required. Cooling is sometimes required to control the reaction rate. The compounds of this invention can be recovered from the mixture and purified by standard procedures.

Preparation of the compounds of this invention is illustrated by the following examples. 1,3-dichloroacetone-0-(3-methylbenzoyl) oxime.

Example 1.

63.5 gms. (0.50 moles) 1,3-dichloropropanone, 69.5 gms. (1.00 moles) hydroxylamine hydrochloride, 250 ml. ethanol and 25 ml. of water are combined and heated under reflux for four hours. The cooled mixture is poured into 500 ml. of water. The aqueous solution is extracted with 3 - 100 ml. portions of chloroform. The chloroform phases are combined and dried with anhydrous $MgSO_4$. The chloroform is evaporated to give 66.3g. (93.6% of theory) of 1,3-dichloroacetoneoxime,

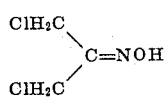

$N_D^{30}= 1.5044$.

14.2 gms (0.1 moles) of 1,3-dichloroacetoneoxime prepared according to the above procedure and 14.4 gms. (0.093 moles) of m-toluoyl chloride are combined in 200 ml. of benzene and the mixture is cooled to 15°C. 12.1 gms. (0.12 moles) of triethylamine are added dropwise while keeping the temperature between 15° - 20°C. with stirring. The reaction is continued 30 minutes after the completion of the addition of triethylamine. The mixture is washed twice with water, twice with $NaHCO_3$ and again twice with water. The benzene phase is dried with anhydrous $MgSO_4$ and evaporated to give 11.1 g. of 1,3-dichloroacetone-0-(3-methylbenzoyl) oxime,

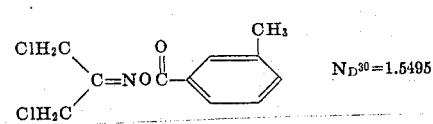

$N_D^{30}=1.5495$

The following is a table of certain selected compounds that are prepared according to the procedure described hereto. Compound numbers are assigned to each compound and are used throughout the remainder of the application.

TABLE I

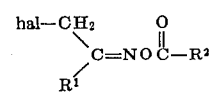

| Compound Number | hal | R¹ | R² |
|---|---|---|---|
| 1 | chloro | chloromethyl | phenyl |
| 2 | chloro | chloromethyl | 2-chlorophenyl |
| 3 | chloro | chloromethyl | 4-chlorophenyl |
| 4 | chloro | chloromethyl | 3,4-dichlorophenyl |
| 5 | chloro | chloromethyl | 3-chlorophenyl |
| 6 | chloro | chloromethyl | 4-bromophenyl |
| 7 | chloro | chloromethyl | 2-bromophenyl |
| 8 | chloro | chloromethyl | 4methoxyphenyl |
| 9 | chloro | chloromethyl | 2-methoxyphenyl |
| 10 | chloro | chloromethyl | 3,4,5-trimethoxyphenyl |
| 11 | chloro | chloromethyl | 4-nitrophenyl |
| 12 | chloro | chloromethyl | 3-nitrophenyl |
| 13 | chloro | chloromethyl | 3,5-dinitrophenyl |
| 14 | chloro | chloromethyl | 4-methylphenyl |
| 15 | chloro | chloromethyl | 3-methylphenyl |
| 16 | chloro | chloromethyl | 2-methylphenyl |
| 17 | chloro | chloromethyl | styryl |
| 18 | chloro | chloromethyl | 2-furyl |
| 19 | chloro | chloromethyl | benzyl |
| 20 | chloro | chloromethyl | $-CH_2CH_2-\langle\text{phenyl}\rangle$ |
| 21 | chloro | chloromethyl | cyclohexyl |
| 22 | chloro | phenyl | 4-chlorophenyl |
| 23 | chloro | hydrogen | phenyl |
| 24 | chloro | phenyl | phenyl |
| 25 | chloro | hydrogen | 4-chlorophenyl |
| 26 | chloro | hydrogen | 4-nitrophenyl |
| 27 | chloro | hydrogen | styryl |
| 28 | chloro | hydrogen | 4-methoxyphenyl |
| 29 | chloro | hydrogen | 4-methylphenyl |

The following tests illustrate utility of the compounds in controlling fungi and bacteria and as acaricides.

In vitro vial test. This test measures the bactericidal and fungicidal properties of a compound when in contact with a growing bacterium or fungus. The test is conducted by partially filling two 1-ounce vials with malt broth and one 1-ounce vial with nutrient broth. Next, the test compound is added to the vials at a certain concentration, expressed in parts per million, and mixed with the broth. A water suspension of spores of the desired fungi or cells of the desired bacteria (one organism per vial) is added. The vials are then sealed and incubated for one week; at this time the vials are examined and the results recorded. Table IV shows the results of various compounds tested by the in vitro vial test.

TABLE II

Concentration (p.p.m.) which inhibited growth.*

| Compound | Fungus | | Bacteria |
| | Aspergillus niger | Penicillium sp. | Staphylococcus Aureus |
|---|---|---|---|
| 1 | 0.25 | (0.13) | (25) |
| 2 | (5) | (1) | 25 |
| 3 | (0.13) | (0.13) | 25 |
| 4 | (0.13) | (0.25) | 10 |
| 5 | (0.25) | (0.25) | 10 |
| 6 | (0.25) | (0.25) | (10) |
| 7 | (0.5) | 1 | 50 |
| 8 | (5) | (1) | (10) |
| 9 | 5 | 25 | 50 |
| 10 | (1) | (25) | >50 |
| 11 | (5) | (0.5) | 25 |

| | | | |
|---|---|---|---|
| 12 | (5) | (1) | 15 |
| 13 | >50 | (50) | >50 |
| 14 | (0.5) | (0.25) | 5 |
| 15 | 0.5 | (0.5) | 5 |
| 16 | 10 | (5) | 10 |
| 17 | (0.5) | (0.25) | 25 |
| 18 | (0.5) | (0.25) | 25 |
| 19 | (0.5) | (0.5) | (25) |
| 20 | (10) | (1) | (10) |
| 21 | 5 | (0.25) | (25) |
| 22 | (50) | (50) | >50 |
| 23 | (10) | (10) | >50 |
| 24 | 5 | 10 | >50 |
| 25 | 5 | 5 | >50 |
| 26 | (25) | (10) | >50 |
| 27 | 50 | (10) | >50 |
| 28 | 50 | (25) | >50 |
| 29 | 50 | 25 | >50 |

\* ( ) = partial control

As can be seen by the test results, the compounds of the present invention find particular utility as bactericides and fungicides. The compounds can be applied in a variety of ways at various concentrations. They can be combined with suitable carriers and applied as dusts, sprays or drenches. The amount applied will depend on the nature of the utility. The rate of application can also vary with the microbiological use intended.

Acaricidal Evaluation Test. - The two-spotted mite, Tetranychus telarius (Linn.), was employed in tests for acaricides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v/v Sponto 221$^R$, an emulsifying agent, the amount of water being sufficient to give concentrations of active ingredient ranging from 0.25 percent to 0.001 percent. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD-50 value was calculated using well-known procedures. These values are reported under the columns "PE" and "Eggs" in Table II.

TABLE III

| Compound Number | Acaricidal Activity | |
|---|---|---|
| | PE | Eggs |
| 1 | 0.01 | 0.03 |
| 2 | 0.05 | >0.05 |
| 3 | 0.01 | 0.03 |
| 4 | 0.008 | 0.03 |
| 5 | 0.01 | >0.05 |
| 6 | 0.01 | 0.05 |
| 7 | 0.01 | 0.05 |
| 8 | 0.05 | >0.05 |
| 9 | >0.05 | >0.05 |
| 10 | >0.05 | >0.05 |
| 11 | 0.03 | >0.05 |
| 12 | 0.03 | 0.03 |
| 13 | >0.05 | >0.05 |
| 14 | 0.008 | >0.05 |
| 15 | 0.03 | >0.05 |
| 16 | 0.03 | >0.05 |
| 17 | 0.005 | 0.03 |
| 18 | 0.05 | >0.05 |
| 19 | 0.03 | >0.05 |
| 20 | 0.03 | >0.05 |
| 21 | 0.03 | >0.05 |
| 22 | >0.05 | >0.05 |
| 23 | >0.05 | >0.05 |
| 24 | >0.05 | >0.05 |
| 25 | 0.05 | >0.05 |
| 26 | >0.05 | >0.05 |
| 27 | 0.05 | >0.05 |
| 28 | >0.05 | >0.05 |
| 29 | 0.05 | >0.05 |

Various techniques or methods can be employed for contacting acarids with the compounds. For example, spray formulations can be prepared by dissolving a compound in suitable organic solvent such as soluene, xylene, benzene, and the like, and subsequent dispersion of this solution in water in the presence of a surface active wetting or emulsifying agent. Another method by which the acaricidal agents of the present invention can be applied is in the form of dispersible powders, preferably as homogeneous free-flowing dusts commonly formulated by mixing the active component with finely divided solids or carriers such as talc, natural clays, diatomaceous earth, various flours such as walnut shell, wheat and the like. The details of compounding and application are well known to those skilled in the art.

As previously stated, the compounds of this invention are useful as herbicides and especially as post-emergence type herbicides. The post-emergence herbicide testing procedure is as follows:

Post-emergence Herbicide Test. The seeds of crabgrass, watergrass, red oats, Indian mustard, curly dock and pinto bean were planted in individual rows in Santa Cruz sandy loam soil. After growing for two weeks under greenhouse conditions, the plates were four to six inches tall. Thereafter, the candidate test compound was applied to the foliage by means of an overhead spray while the flat moved under the spray on a moving table. A concentration of 0.5 percent of active compound in the spray was used at a rate equivalent to approximately 60 lbs./acre. Two weeks after treatment, the injury results were recorded and it was determined that the compounds of the invention have utility as herbicides, especially post-emergence herbicides.

Compound Numbers 1, 4 and 17 were selected for further evaluation and were found to give generally excellent control at the application rate of 2 pounds per acre of certain weed species as is shown in Table IV.

TABLE IV

Percent Control

| Compound Number | Crabgrass | Pigweed | Mustard |
|---|---|---|---|
| 1 | 60 | 80 | 20 |
| 4 | 40 | 98 | 99 |
| 17 | 0 | 98 | 100 |

The compounds of the present invention as post-emergence herbicides and can be applied in a variety of ways at various concentrations. They may be combined with suitable carriers and applied as dusts, sprays or drenches. The amount applied will depend upon the nature of the weeds or plants to be controlled and the rate of application may vary from 1 to 80 pounds per acre. One particularly advantageous way of applying the compounds is as a narrow band along a row crop, straddling the row. It is not necessary that the phytotoxic compositions be admixed with the soil particles and these compositions can be applied merely by spraying the sprinkling the surface of the soil. The phytotoxic compositions of this invention can also be applied to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example fertilizers, pesticides and the like, used as adjuvant or in combination with any of the above-described adjuvants. Other phytotoxic compounds useful in combination with the above-described compounds include for example 2,4-dichlorophenoxyacetic acids, 2,4,5-trichlorophenoxyacetic acid, 2 - methyl -4-chlorophenoxyacetic acid and the salts, esters and amides thereof; triazine derivatives, such as 2,4-bis (3-methoxypropylamino)-6-methylthio-S-triazine; 2-chloro-4-ethylamino-6-isopropylamino-S-triazine, and 2-ethylamino-4-isopropylamino-6-methylmercapto-S-triazine, urea derivatives, such as 3-(3,4-dichlorophenyl)-1,1-dimethyl urea and 3-(p-chlorophenyl)-1,1-dimethyl urea and acetamides such as N,N- diallyl-α-chloroacetamide, N-(α-chloroacetyl) hexamethylene imine, and N,N-diethyl-a-bromacetamide, and the like; benzoic acids such as 3-amino-2,5-dichlorobenzoic and; thiocarbamates, such as S-propyl dipropylthiocarbamate; S-ethyl-dipropylthiocarbamate, S-ethyl-cyclohexyl-ethyl-thiocarbamate, S-ethyl hexahydro-1H-azepine-1-carbothioate and the like. Fertilizers useful in combination with the active ingredients include for example ammonium nitrate, urea and superphosphate. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art.

We claim:
1. The method of combating weeds comprising applying to the weed habitat a phytotoxic amount of a compound having the formula:

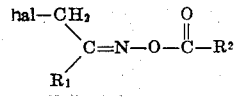

in which hal is a member selected from the group consisting of chlorine, bromine and iodine, $R^1$ is a member selected from the group consisting of (1) hydrogen, (2) lower alkyl, having one to six carbon atoms, (3) and haloalkyl having 1 to 4 carbon atoms, and $R^2$ is a member selected from the group consisting of (1) phenyl, (2) nuclear substituted derivatives thereof in which the substituents are selected from the group consisting of halogen, cyano, nitro, lower alkoxy having one to four carbon atoms, and lower alkyl having one to four carbon atoms, (3) styryl, (4) nuclear substituted styryl, in which the substituents are selected from the group consisting of halogen, cyano, nitro, lower alkoxy having one to four carbon atoms, and lower alkyl having one to four carbon atoms, (5) benzyl, (6) nuclear substituted benzyl in which said substituents are selected from the group consisting of halogen, cyano, nitro, lower alkoxy having one to four carbon atoms, and lower alkyl having one to four carbon atoms, (7) phenethyl, (8) nuclear substituted phenethyl in which the substituents are selected from the group consisting of halogen, cyano, nitro, lower alkoxy having one to four carbon atoms, and lower alkyl having one to four carbon atoms, (9) cycloalkyl having three to six carbon atoms, and (10) furyl.

2. The method of claim 1 in which $R^1$ is chloromethyl and $R^2$ is phenyl.

3. The method of claim 1 in which $R^1$ is chloromethyl and $R^2$ is halogen substituted phenyl.

4. The method of claim 1 in which $R^1$ is chloromethyl and $R^2$ is styryl.

* * * * *